(12) United States Patent  (10) Patent No.: US 8,189,532 B2
Vinayakray-Jani et al.  (45) Date of Patent: May 29, 2012

(54) MOBILE NODE, A METHOD OR HANDOVER AND A COMPUTER PROGRAM

(75) Inventors: Preetida Vinayakray-Jani, Espoo (FI); Pasi Antti Sarolahti, Espoo (FI)

(73) Assignee: Nokia Corporation, Espoo (FI)

( * ) Notice: Subject to any disclaimer, the term of this patent is extended or adjusted under 35 U.S.C. 154(b) by 1188 days.

(21) Appl. No.: 12/003,459

(22) Filed: Dec. 26, 2007

(65) Prior Publication Data

US 2009/0168720 A1   Jul. 2, 2009

(51) Int. Cl.
 *H04W 4/00* (2009.01)
(52) U.S. Cl. ..... 370/331; 370/332; 370/334; 455/432.1; 455/435.1; 455/436; 455/445
(58) Field of Classification Search ................. 370/331, 370/332, 333, 334; 455/432.1, 435.1, 436, 455/437, 442, 443, 444, 445
See application file for complete search history.

(56) References Cited

U.S. PATENT DOCUMENTS

| | | | |
|---|---|---|---|
| 6,704,571 B1* | 3/2004 | Moon | 455/436 |
| 6,757,245 B1* | 6/2004 | Kuusinen et al. | 370/230 |
| 6,876,639 B1* | 4/2005 | Cao | 370/331 |
| 2004/0090936 A1* | 5/2004 | Cuny et al. | 370/331 |
| 2005/0041581 A1* | 2/2005 | Kuusinen et al. | 370/230 |
| 2005/0088972 A1* | 4/2005 | Zhang et al. | 370/235 |
| 2005/0141455 A1* | 6/2005 | Kim et al. | 370/331 |
| 2006/0259951 A1* | 11/2006 | Forssell et al. | 726/1 |
| 2008/0107079 A1* | 5/2008 | Bae et al. | 370/331 |
| 2008/0225829 A1* | 9/2008 | Sachs et al. | 370/351 |

OTHER PUBLICATIONS

Yuci Gou, David Pearce, Paul Mitchell. "A Receiver-based Vertical Handover Mechanism for TCP Congestion Control". IEEE Transaction on Wireless Communications, vol. 5, No. 10, Oct. 2006.*

* cited by examiner

*Primary Examiner* — Ian N Moore
*Assistant Examiner* — Brian T Le
(74) *Attorney, Agent, or Firm* — Squire Sanders (US) LLP

(57) ABSTRACT

A mobile node comprising a handover engine configured to control the handover of the mobile node from one access node to another access node, said handover engine being arranged to provide TCP window size information to a TCP endpoint node, to which the mobile node is connected via a connection, before said handover engine initiates registration of a new location address for said connection.

21 Claims, 4 Drawing Sheets

MOBILE NODE, A METHOD OR HANDOVER AND A COMPUTER PROGRAM

BACKGROUND OF THE INVENTION

1. Field of the Invention

The present invention relates to a mobile node, a method or handover and a computer program.

A mobile communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communications via a communication system and can thus be used for accessing various applications.

A communication system is a facility which supports communication between two or more entities such as mobile communication devices, network entities and other nodes. A communication system may be provided by one or more interconnected networks. One or more gateway nodes may be provided for interconnecting various networks of the system. For example, a gateway node may be provided between an access network and other communication networks, for example a core network and/or a data network.

An appropriate access network allows the communication devices to access the wider communication system. Access to the wider communications system may be provided by means of a fixed line or wireless communication interface, or a combination of these. Communication systems provide wireless access that enable at least some mobility for the users thereof. Examples of these include wireless communication systems where the access is provided by means of an arrangement of cellular access networks. Other examples of wireless access technologies include different wireless local area networks (WLANs) and satellite based communication systems.

A wireless access network typically operates in accordance with a wireless standard and/or with a set of specifications which set out what the various elements of the system are permitted to do and how that should be achieved. For example, the standard or specification may define if the user, or more precisely the mobile communication device, is provided with a circuit switched bearer or a packet switched bearer, or both. Communication protocols and/or parameters which should be used for the connection are also typically defined. For example, the manner in which communication should be implemented between the mobile communication device and the elements of the networks and their functions and responsibilities are typically defined by a predefined communication protocol.

The Transmission Control Protocol (TCP) is one of the core protocols of the Internet protocol suite. TCP provides reliable, in-order delivery of a stream of bytes, making it suitable for applications such as file transfer and e-mail.

However, TCP performance has not been engineered for mobility events in multi-radio mobile hosts. Traditionally, TCP has applied a set of congestion control algorithms (slow-start, congestion avoidance, fast retransmit, fast recovery) to probe the currently available bandwidth on the established connection path. These algorithms need several round-trip times to find the correct transmission rate (i.e., congestion window), and adapt to sudden changes, for example due to mobile hand-off or handover, slowly. Handover is when a mobile node hands off from one access node to another. This handoff may be between access nodes of different networks.

TCP is implemented as a separate component as a part of communication/networking subsystem in an operating system, and is therefore often unaware of the mobility events occurring due to the nature of a multi-radio communication, at a lower layer. Multi-radio devices are able to deal with two or more different radio access technologies simultaneously.

In a heterogeneous networking environment, the Mobile Node (MN) or user equipment often encounters instant changes in link performance and coverage. However such abrupt changes in link quality or coverage either interrupts or terminates an ongoing TCP connection and eventually deteriorates the performance of the ongoing application flows, in addition to delaying the registration process for mobility protocols (for example, registering to Rendez-vous Server (RVS) for Host Identity Protocol (HIP), or binding updates to a Home Agent (HA) for Mobile Internet Protocol (MIP)). Furthermore there is no classical TCP stack which can handle connections efficiently on these paths with changing heterogeneous characteristics.

Additionally different applications have different networks and TCP requirements. TELNET values short response time (delay sensitivity), but the File Transfer Protocol values high throughput (delay tolerant). Moreover applications run on a mobile node such as a phone or small PDA (personal data assistant) have limited power. Generally TCP may avoid unnecessary retransmission to save energy. TELNET (TELecommunication NETwork) is a network protocol used on the Internet or local area network (LAN) connections.

A TCP window defines the amount of outstanding (unacknowledged by the recipient) data a sender can send on a particular connection before the sender gets an acknowledgment back from the receiver that the receiver has received some of that data.

It has been proposed to adjust a TCP's receive window to suppress the TCP sender from sending further data, and to adjust the receive window to be better suitable for a slow modem link. However, this has targeted environments with static and fixed setup, and has not been applied in a dynamic network environment with different types of applications and multiple available networks with terminal mobility.

It has also been proposed to adjust a TCP's slow-start threshold based on explicit indication of available bandwidth on the path. This requires modifications to the TCP sender side that is often a fixed server and therefore inaccessible to the mobile terminal vendors.

The paper titled "Using Quick-Start to Improve TCP Performance with Vertical Hand-offs" at http://csdl2.computer.org/persagen/DLAbsToc.jsp?resourcePath=/dl/proceedings/&toc=comp /proceedings/lcn/2006/0418/00/0418toc.xml&DOI=10.1109/LCN.2006.322197] discusses the use of slow-start threshold after vertical hand-off, not receiver window.

"Experiences with Heterogeneous Wireless Networks, Unveiling the Challenges" by Vidales et al. describes setting the receiver window to zero during the handoff to suspend the sender and avoid packet losses. This is available from: [http://www.cl.cam.ac.uk/research/dtg/publications/public/pav25/HetNets04-Vidales.pdf].

Reference is made to "TCP auto-tuning zoo" which describes receive buffer auto tuning based on bandwidth-delay product, but this does not discuss the vertical handoff case: This document is available from [http://www.csm.ornl.gov/~dunigan/net100/auto.html]

"Multi-Layer Protocol Tracing in a GPRS Network" by Gurtove et al (available from [http://www.cs.helsinki.fi/u/gurtov/papers/vtc02.pdf]), suggests that the buffer of all links should be configured with maximum bandwidth delay product. However this relies on the operator and this might be difficult to justify when there is a link with low bandwidth-delay product, and may cause excess queuing.

Reference is made to the IETF (Internet Engineering Task Force) Draft Specification Mobility Services Transport: Problem Statement draft-ietf-mipshop-mis-ps-03 which is available from http://www.ietf.org/internet-drafts/draft-ietf-mipshop-mis-ps-03.txt. This draft provides the Mobility service transport protocol (MSTP) for the Media Independent Handover (MIH) protocol (MIH is an IEEE solution within 802.21 TG), that can operate over network layer. The requirements for MSTP include discovery, security, low latency, reliability etc. This draft indicates that handover support in heterogeneous wireless environments requires the functional components located within in a mobile terminal or in the network to exchange the handover or mobility relevant information and eventually to take decisions upon this information exchange. The traditional host-based handover solution could be complemented with more sophisticated network-centric solutions.

US20060291435 adjusts TCP parameters/windows according to used wireless bearer with a preconfigured window size for each bearer.

Reference is made to the IETF (Internet Engineering Task Force) Draft Specification Lightweight Mobility Detection and Response (LMDR) Algorithm for TCP draft-swami-tcp-lmdr-07 which is available from http://www1.tools.ietf.org/html/draft-swami-tcp-lmdr-07 which deals with TCP.

Another approach is for wireless link endpoints to choke TCP senders during handoffs, by transparently closing the receiver's advertised window (See "TCP Performance Issues over Wireless Links" IEEE Communications Magazine, Vol 39, Number 4, 2001, pages 52-58).

US20030219034 describes reducing TCP window size if link quality deteriorates.

It is an aim of certain embodiments of the present invention to solve one or more of the aforementioned problems.

SUMMARY OF THE INVENTION

According to one aspect of the present invention, there is provided a mobile node comprising a handover engine configured to control the handover of the mobile node from one access node to another access node, said handover engine being arranged to provide TCP window size information to a TCP endpoint node, to which the mobile node is connected via a connection, before said handover engine initiates registration of a new location address for said connection.

According to another aspect of the present invention, there is provided a handover method comprising sending TCP window size information for a mobile node to a TCP endpoint to which the mobile node is connected via a connection, when the mobile node is to be handed over from one access node to another access node; and initiating registration of a new location address for said connection after said TCP window size information has been provided.

According to a further aspect of the present invention, there is provided a mobile node comprising means for controlling the handover of the mobile node from one access node to another access node; means for providing TCP window size information to a TCP endpoint node, to which the mobile node is connected via a connection; and means for initiating registration of a new location address for said connection, after providing said TCP window size information.

According to a further aspect of the present invention, there is provided an integrated circuit for a mobile node, said integrated circuit comprising a handover engine configured to control the handover of the mobile node from one access node to another access node, said handover engine being arranged to provide TCP window size information to a TCP endpoint node, to which the mobile node is connected via a connection, before said handover engine initiates registration of a new location address for said connection.

According to another aspect of the present invention, there is provided a computer program product having computer executable components comprising a first computer executable component for sending TCP window size information for a mobile node to a TCP endpoint to which the mobile node is connected via a connection, when the mobile node is to be handed over from one access node to another access node; and a second computer executable component for initiating registration of a new location address for said connection after said TCP window size information has been provided

BRIEF DESCRIPTION OF THE DRAWINGS

For a better understanding of the embodiments and how the same may be carried into effect, reference will now be made by way of example only to the accompanying drawings in which.

DETAILED DESCRIPTION OF THE PREFERRED EMBODIMENTS

Figure 1:
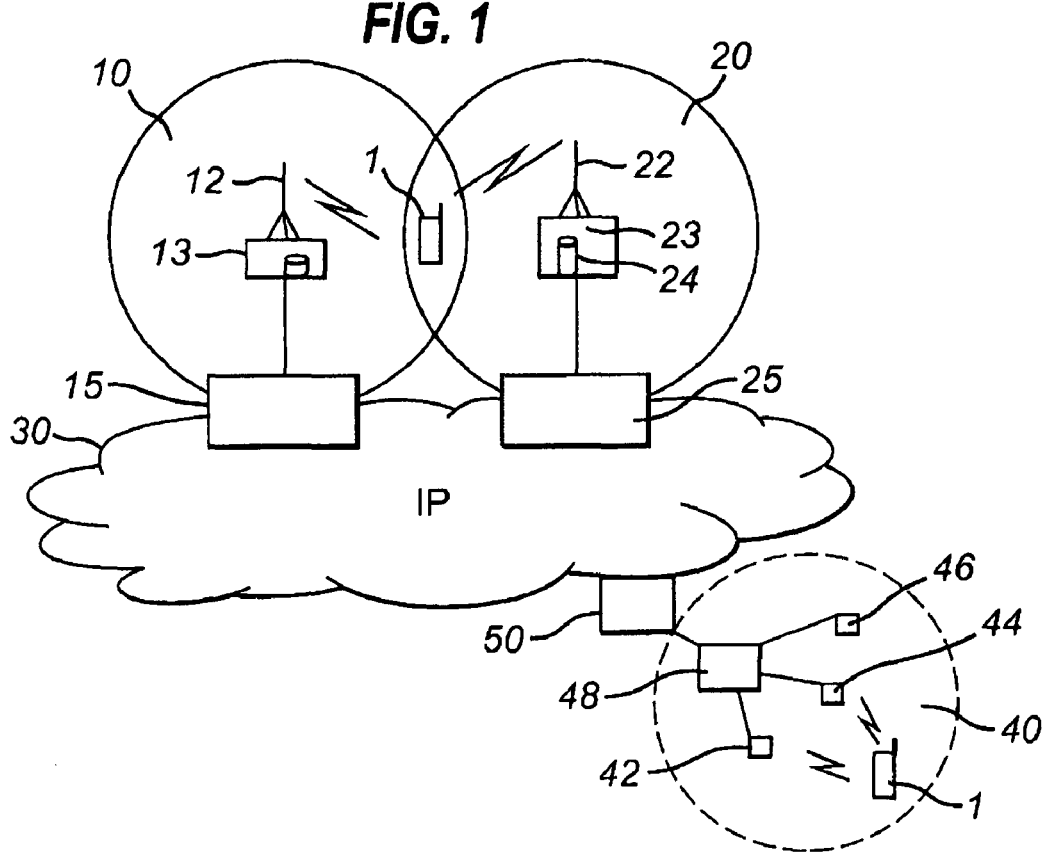
FIG. 1 shows a schematic presentation of three wireless access systems a mobile device may use for accessing a data network.

Before explaining in detail certain exemplifying embodiments, certain general principles of wirelessly accessing a communication system are briefly explained with reference to FIGS. 1 and 2.

A communication device can be used for accessing various services and/or applications provided via a communications system. In wireless or mobile systems the access is provided via an access interface between a mobile device 1 and an appropriate wireless access network 10, 20, 40.

A mobile device 1 can typically access wireless communication networks via at least one base station and or similar wireless transmitter and/or receiver node. Non-limiting examples of appropriate access nodes are base stations 12, 22 of a cellular system and access points (APs) 42, 44, 46 of a wireless local area network (WLAN) 48. Each mobile device 1 may have one or more radio channels open at the same time and may be connected to more than one base station/access point.

A base station is typically controlled by at least one appropriate controller entity 13, 23 so as to enable operation thereof and management of mobile devices in communication with the base station. The controller entity is typically provided with memory capacity and at least one data processor.

A mobile device may be used for accessing various applications. For example, a mobile device may access applications provided in a data network 30. For example, various applications may be offered in a data network that is based on the Internet Protocol (IP) or any other appropriate protocol.

In FIG. 1 the base station nodes 12 and 22 are connected to the data network 30 via appropriate gateways 15 and 25 respectively. A gateway function between a base station node and another network may be provided by means of any appropriate gateway node, for example a packet data gateway and/or an access gateway.

Also shown in FIG. 1 is a WLAN system 48. A mobile communication device 1 functioning as a WLAN terminal is connected to a WLAN system 48 and in particular to an access point 42, 44, 46 thereof. A gateway 50 is provided for connection to an external network, for example network 30. The gateway 50 may form part of a single physical entity with at least one entity of the WLAN system 48.

Figure 2:
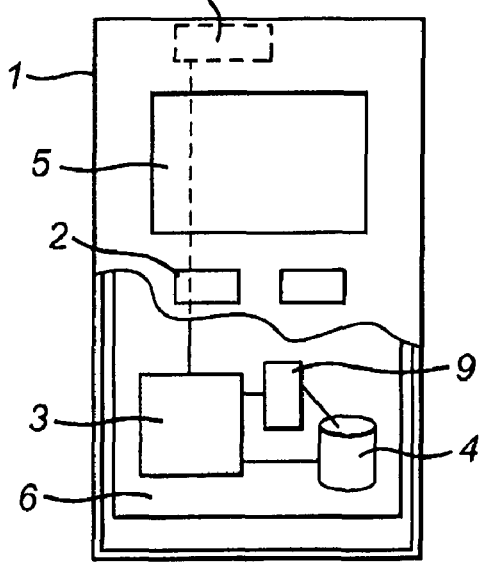
FIG. 2 shows a partially sectioned view of a mobile device.

FIG. 2 shows a schematic partially sectioned view of a mobile communication device 1 that can be used for accessing a communication system via a wireless interface. The mobile device 1 of FIG. 2 can be used for various tasks such as making and receiving phone calls, for receiving and sending data from and to a data network and for experiencing, for example, multimedia or other content.

An appropriate mobile communication device may be provided by any device capable of at least sending or receiving radio signals. Non-limiting examples of mobile communications devices include a mobile node (MS), a portable computer provided with a wireless interface card or other wireless interface facility, personal data assistant (PDA) provided with wireless communication capabilities, or any combinations of these or the like. The mobile communication device 1 may communicate via an appropriate radio interface arrangement of the mobile communication device. In FIG. 2, the radio interface arrangement is designated schematically by block 7. The interface arrangement may be provided for example by means of a radio part and associated antenna arrangement. The antenna arrangement may be arranged internally or externally to the mobile communication device. The radio interface arrangement may comprise disparate radio units configured to connect to disparate access networks, such as cellular and WLAN networks.

A mobile communication device is typically provided with at least one data processing entity 3 and at least one memory 4 for use in tasks it is designed to perform. The data processing and storage entities can be provided on an appropriate circuit board and/or in chipsets. This feature is denoted by reference 6. Examples of data processing entity embodiments are processor, microcontroller, field-programmable gate array, application-specific integrated circuit or combinations thereof.

The user may control the operation of the mobile communication device by means of a suitable user interface such as key pad 2, voice commands, touch sensitive screen or pad, combinations thereof or the like. A display 5, a speaker and a microphone may also be provided. Furthermore, a mobile communication device may comprise appropriate connectors (either wired or wireless) to other devices and/or for connecting external accessories, for example hands-free equipment, thereto.

The mobile communication device 1 may be enabled to communicate with a number of access nodes, for example when it is located in the coverage areas of the two base stations 12 and 22 or within the coverage area of the access points 42, 44, 46 of the WLAN in FIG. 1. This capability is illustrated in FIG. 2 by the two wireless interfaces 11 and 21.

The mobile communication device 1 can be handed over from one access node, such as a base station or access point, to another access node. Furthermore, the mobile communication device 1 can be handed over from one access network to another access network.

Figure 3:
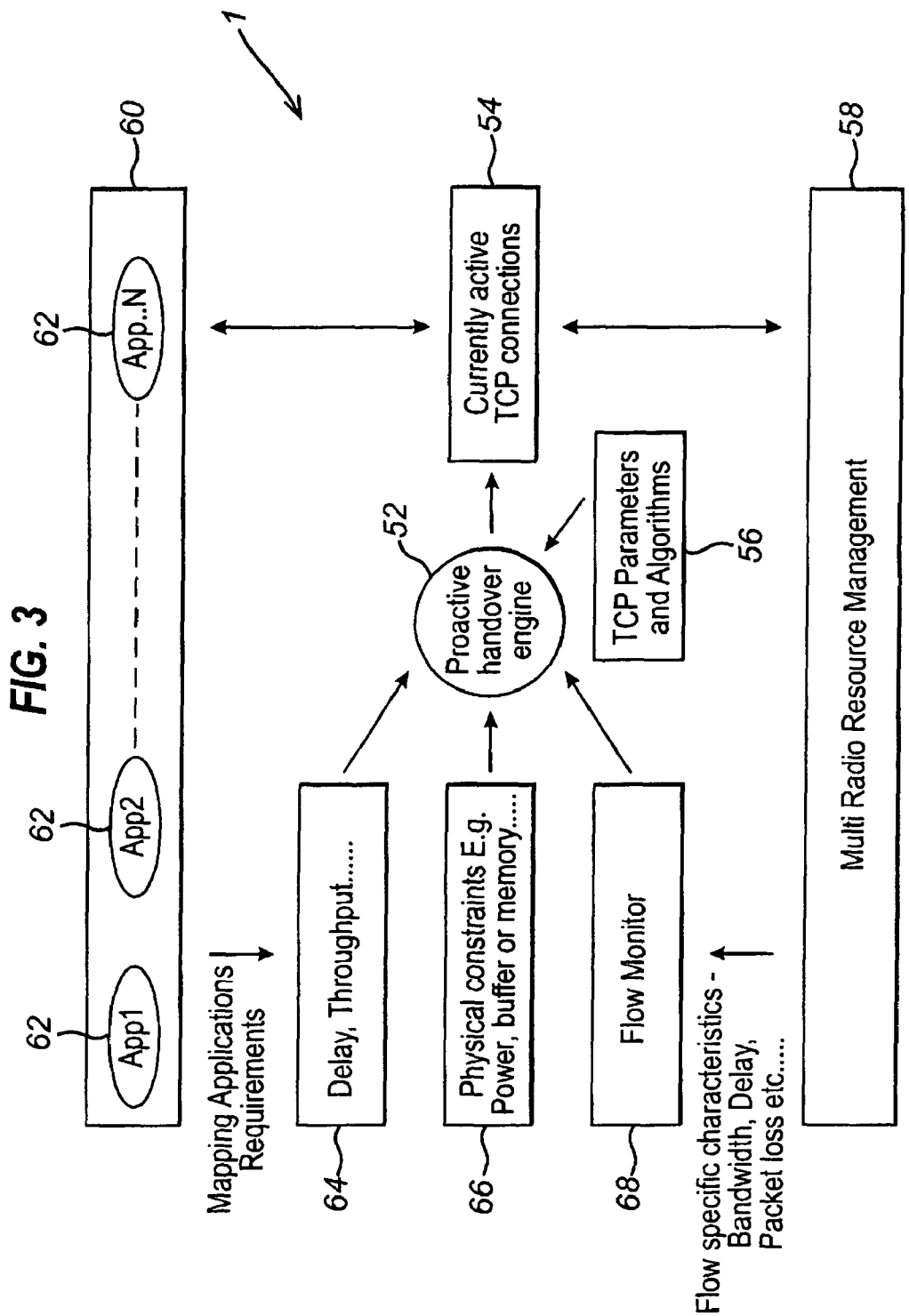
FIG. 3 shows the functional components for handover in a mobile device.

FIG. 3 depicts the relationship among proactive handover engine 52 and TCP mechanisms, physical constraints such as power and buffer units of the mobile communication device, monitoring of active flows characteristics through flow monitor and currently active TCP connections and methods or algorithms associated with TCP connection. The elements shown in FIG. 3 are all provided, in one embodiment of the invention, in the mobile communications device 1. The various units of the mobile communications device 1 shown in FIG. 3 may be implemented at least partly by memory and data processing entity capability. One or more memories may be provided. Similarly one or more data processing entities may be provided. At least some, and in some cases all, of the units shown in FIG. 3 may be provided on an integrated circuit or by a chipset. The units shown in FIG. 3 may be provided by distinct entities or a single entity may provide at least part of two or more of the units of FIG. 3.

The proactive handover engine 52 will now be described in more detail. This engine 52 considers the mapped application requirements from the application unit 60. The application unit 60 is capable of running one or more applications 62. The mapping application requirements are sent to the proactive handover engine via the delay and throughput unit 64.

The application unit 60 determines the mapping requirements of a particular application. For example, the unit determines the bandwidth requirements for the specific flow generated by one or more of the applications 62 and delivers this information to the handover engine. Thus depending on the network bandwidth delay product and the flow requirements, the handover engine 52 determines the consistent usage of local resources as well as allocating the proportional TCP window sizes to the flows. Thus the handover engine determines the local resources for flows relevant to different service classes in proportional manner.

The proactive handover engine also receives TCP parameters from the TCP parameters and algorithm unit 56. The TCP parameters and algorithm unit 56 may provide the various parameters which proactive handover engine can use to inform the proactive handover agent. Additionally the TCP unit 56 can request that the ongoing TCP connection adapt to those changes. Such TCP parameters include TcpWindowSize, maximum segment size (MSS), automatic buffer tuning etc. Certain embodiments of the invention use TcpWindowSize as a part of proactive handover engine. Thus in embodiments of the invention, the proactive handover engine considers more parameters than just TCP parameters. The TCP parameter considered may be those relevant to handover. The TcpWindowSize is variable and takes into account the congestion window (at the sender) and advertised window (at the receiver). The congestion window determines the number of bytes that can be outstanding at any time. The size of this window may be determined based on the congestion between the sender and transceiver. The congestion window represents the maximum number of bytes that can be transmitted without acknowledgment. The advertised window represents the number of bytes that can be received without requiring an acknowledgment.

In a TCP connection between the receiver and the sender, the receiver tells the sender the number of bytes that the receiver is willing to receive, this is the receiver's receive window, which becomes senders send window. Likewise the sender tells the receiver how many bytes of data it is willing to take from the receiver at a time, this is sender's receive window and receiver's send window. The receiver flow control try to avoid overloading the receiver, hence the receiver sets the receiver window also known as advertised window—awnd. Meanwhile to avoid overloading the network, a window size is set by a sender known as congestion window—cwnd and this may infer available network capacity. The sender constantly or continuously adjusts the congestion window to estimate the appropriate sending rate given the network congestion: when the network becomes more congested, the congestion window is reduced; when network becomes less congested, the congestion window is increased.

In general

Window size=min(cwnd, awnd)

The receiver advertises the advertised window awnd with each acknowledgement ACK and the advertised window awnd is closed when data is received and acknowledged. It is opened when data is read. Thus the size of the advertised window awnd may determine the performance limit The proactive handover engine 52 may be arranged to receive information from a physical constraints unit 66. This information may comprise one or more of power constraints, buffer constraints and memory constraints.

The proactive handover engine 52 may also receive an input from a flow monitor 68 which will be described in more detail hereinafter.

Using the various information received by the proactive handover engine, the handover engine is arranged to determine the imminent possibility of handover for the mobile communications device and to determine the possible target network for connection/handover.

The flow monitor 68 is arranged to collects the flow characteristics from the multi radio resource management unit 58 (MRRM) in terms of bandwidth availability, delay, Round Trip Time (RTT), jitter, packet loss rate, asymmetry of bandwidth or the like.

Some embodiments of the present invention seek to provide seamless inter-system handover and to prevent or reduce bottleneck queues from the buffer overflow in network, as well as to minimize under-utilization of networks.

For handover, the MN, that is the mobile communications device, advertises the appropriate TCP receive window size to its Corresponding Node (CN), while preparing itself for inter-system handover. For preventing or reducing bottleneck queues, the appropriate time interval between the advertisement of new window size and registration of new location address to RVS/HIP or HA/MIP is determined.

Figure 4:
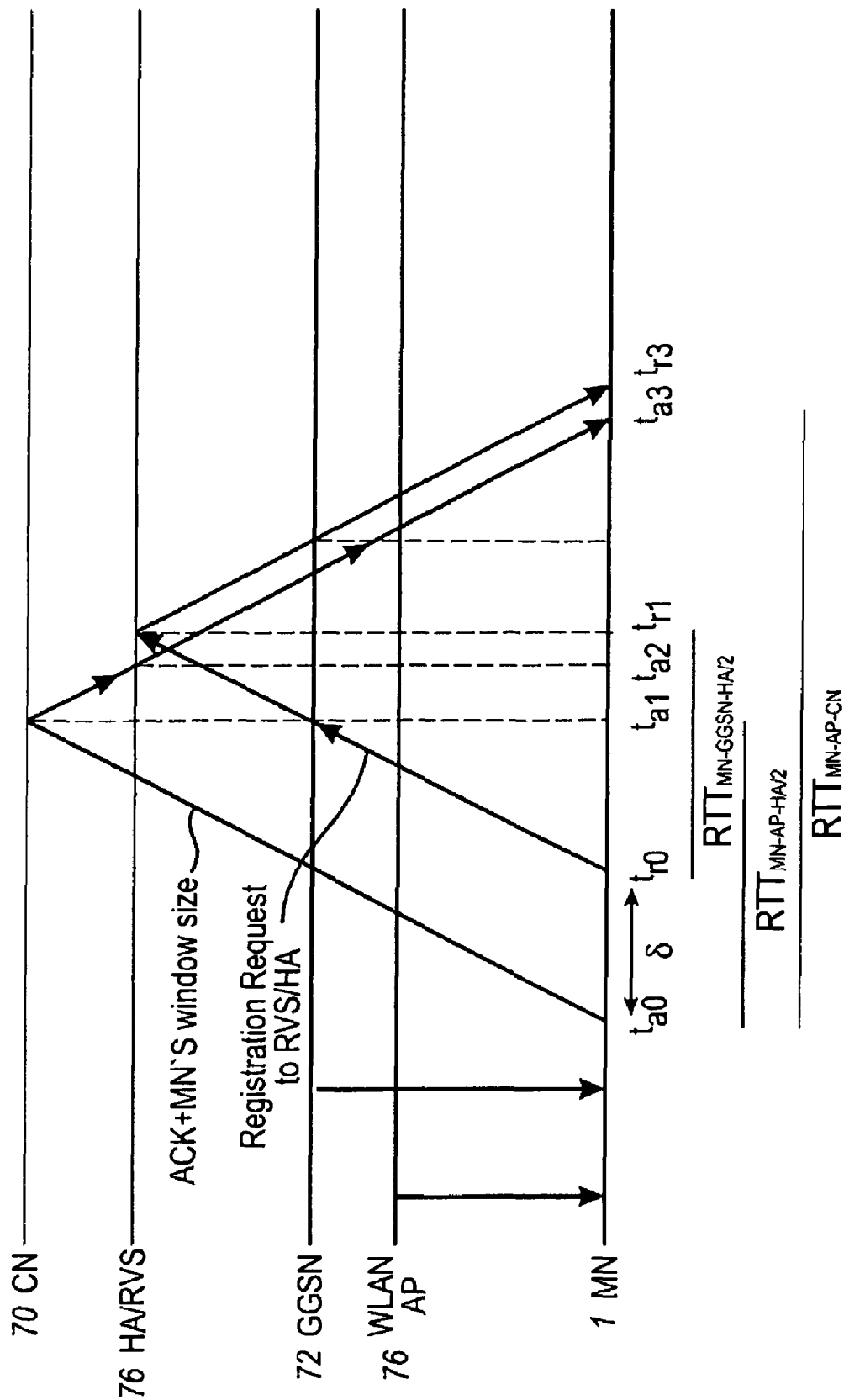
FIG. 4 shows a timing diagram showing the operation view of inter-system handover and FIG. 5 shows a flowchart of a method embodying the present invention.
Figure 5:
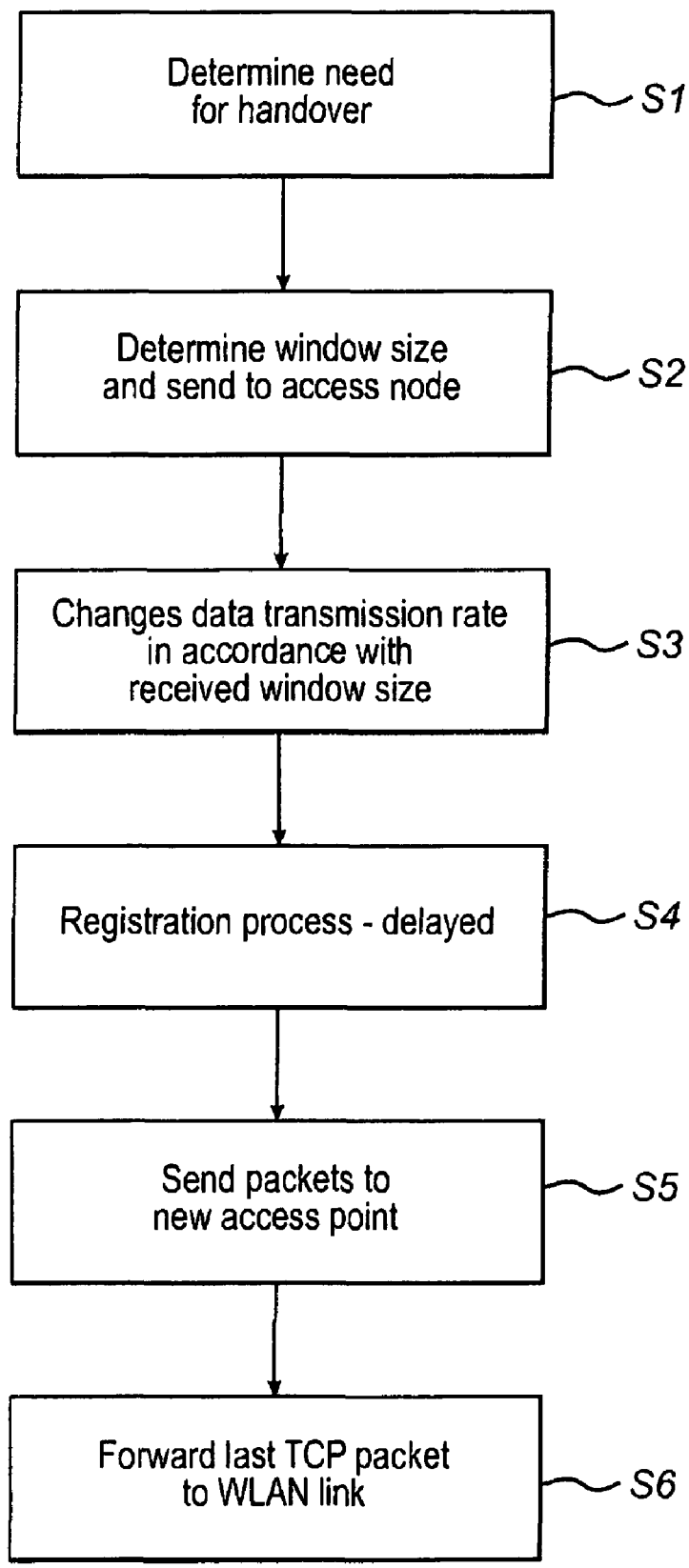

A first situation when the mobile communications device hands over from a WLAN system to a GPRS (General Packet Radio Service) will be described with reference to FIG. 4 and FIG. 5. FIG. 4 shows a timing diagram showing the timing of signals between node MN 1, a CN 70 of a 2G/3G, a GGSN (Gateway GPRS serving node) 72, a HA/RVS 74 and an access point 76 of a WLAN. FIG. 5 shows a flow diagram of a method embodying the invention. The correspondent node CN 70 represents the other end point of the TCP connection. Thus the mobile node MN1 is one end of the TCP connection and the correspondent node CN is at the other end of the TCP connection. The CN 70 can be any suitable entity such as for example, another mobile node or a server.

Initially at S1, the MN detects the imminent possibility for handover for currently active flow(s).

In S2 the MN determines and disseminates the window size to a peer or CN 70 and that can be set as:

$$W_{Default} > GPRSWin_{max} \geq W_{REC} \quad (1)$$

When previously connected to the GPRS network, the MN can try to estimate the maximum window size offered by GPRS through the bandwidth-delay product of the wireless link. This can be determined using the methodology of U.S. patent application Ser. No. 11/902664, which is hereby incorporated by reference. This application is owned by the same assignee and has a priority date of 11$^{th}$ May 2007. The MN also has the default value ($W_{Default}$) of the maximum window size that is usually larger than the bandwidth-delay product of the path. Hence in a network such as GPRS the maximum bandwidth delay product offered is considered to be less than the default value used by TCP. Hence the MN advertises a smaller window ($W_{REC}$) size to the CN, i.e. GPRSwin$_{max}$. If such value would be larger than the default value, the TCP sender could flood the cellular network. This would cause the excess queuing at the 2G/3G (2$^{nd}$ Generation/3$^{rd}$ Generation) base station rather than causing buffer overflow in the MN.

In one alternative, the MN has a previously estimated value of GPRS bandwidth delay product. Using this cached information MN selects the value for the receive window size and advertises it to the CN 70 in a TCP acknowledgement (ACK) packet at $t_{a0}$, as shown in FIG. 4. The MN will deliver a new window size before initiating registration of a new location address to the RVS or HA In step S3, upon receiving the window advertisement for future flows at $t_{a1}$, the CN limits its data transmission rate as per the new received window size. Thus new TCP window adjustment at the CN actively reduces the network congestion by controlling the rate at which the CN communicates. Subsequently MN delays the registration process of received new location for a period of δ and sends the registration request at $t_{r0}$ in S4.

After registration at RVS/HA at $t_{r1}$, in S5 the RVS/HA redirects all the packets to new located address. This new address is the mobile node's new address after the mobile node has been handed over from one access node to the next. The last TCP packet sent just before the use of the new window size encountered by the CN, is received by RVS/HA at time $t_{a2}$ and forwarded to the WLAN link in S6. S5 and S6 may take place in the order shown, the opposite order or more or less at the same time. Therefore if $t_{r1}$ is earlier than $t_{a2}$, some packets are redirected to the GPRS network, before the influence of the new window takes place. This may cause the buffer queue to be filled to overflowing. To avoid this problem, the value of δ may be chosen so that $t_{r1}$ is later than $t_{a2}$. In one embodiment of the invention, the MN determines the value of δ. This may be done as part of the registration step or earlier. It can be seen from a consideration of FIG. 4 that, $$\delta \leq RTT_{MN-AP-CN} - 0.5(RTT_{MN-AP-RVS/HA} + RTT_{MN-GGSN-RVS/HA}) \quad (2)$$

It should be appreciated that although this example is in the context of inter-system handover, embodiments of the invention are also applicable to intra-system handover also.

The handover from GPRS and WLAN may have an issue of under-utilization of resources; as packet processing in GPRS takes longer time due to the absence of sufficient duplicate ACKs to trigger the faster transmission of the packets over the faster WLAN. Hence even though the advertised window size is larger, the packet remains queued for a long time in GPRS due to lack of duplicate ACK packets from WLAN. With the smaller bandwidth of GPRS, the WLAN capacity can be under utilized because the GPRS link may use a smaller size of advertised window than that which the bandwidth-delay product of WLAN would require.

To handle the packet loss while performing the handover to WLAN, the MN may increase the current GPRS window size to match the WLAN bandwidth-delay product. The window may be set appropriately to avoid fragmentation. This will permit CN to send more data benefiting from the fact that a CN can continue to increase its congestion window size when the amount of received window size maximum threshold is crossed. This may create the burst of data packets as well as duplicate ACKs that can trigger the relatively fast transmission of the packets queued at GPRS. Increasing the advertised window size more than two segments may make the CN overflow the network. One segment is the TCP content that fits into one IP packet. Once handover is performed the gradual increase in advertised receiver window size makes consistent utilization of WLAN network Thus using the smaller advertised window size in GPRS allows the mobile communication device to increase advertisement window size by, for example, +1 or +2 segments on handover to WLAN. This will make the sender send more data, taking the benefit from the fact that a sender can continue to increase its congestion window when the amount of outstanding data is limited by the advertised window. Increasing the advertisement window by more than +2 segments will alleviate the starvation or under-utilization, but may result in a burst of packets being transmitted by the sender which may overflow buffers of intermediate routers. Hence following the handover, the advertisement window can be successively enlarged up to the maximum value of the network. The advertised window may be maintained separately for each TCP connection, and therefore also separately for each application.

The TCP window advertisement permits end-systems to actively reduce the congestion (in any TCP queue) by controlling the rate at which end-systems communicate. While performing handover from a faster network (first network) to slower network (second network), the connection heads toward the congestion, the TCP flows are rate shaped by adjusting the receivers' advertised window size and simultaneously slowing down the return of the ACKs, as end-systems communications align toward the consistent possible rate.

When the MN is supported with a multi-homing mobility feature, the mobility protocols are able to move single simultaneously running traffic flows independently from one access interface to another. The simultaneous flows relevant to different or single applications may have different throughput or bandwidth requirements. Such requirements may be influenced by the received window size parameter TcpWindowSize. Therefore the proactive handover engine may allocate the proportional TCP window size by considering the type of the access network available, single flow requirement and available buffer capacity.

In some embodiments of the invention the MN advertises Maximum TcpWindowSize to CN along with the ACK at an appropriate time before initiating for handover and for subsequent TCP packets also. Embodiments of the present invention may be applicable when both end-systems are mobile.

Embodiments of the invention can be used with any link layer technology e.g. WiMAX, WCDMA s LTE, WCDMA, HSXPA, 3G-WiMAX, WINNER (Wireless World Initiative New Radio), etc. and may support the Media Independent handover standardization activity.

Some embodiments are end-system—MN specific. Thus in some embodiments of the invention no modification or enhancement needed in access networks itself, only in the MN.

In some embodiments of the invention, a minimum threshold for the advertised window size is applied. This avoids, in some embodiments, that if the algorithm fails to estimate the correct receive window size, for example by applying too small a window size, prevention of the TCP connection from using the full capacity of the connection path.

Embodiments of the invention may be applied in mobile multi-access communications to improve TCP communication performance.

Embodiments of the invention may provide a TCP mechanism aware of the flows characteristics and ongoing changes that can adapt their behaviour to these change, is an effective and efficient approach to solve such problem. Hence here the attempt is to make the seamless handover more efficient by proactively adapting the TCP transmission windows to adapt the network environment so that congestion and buffer overflow situations can be prevented effectively and MN can experience the seamless mobility with consistent quality.

The proposed proactive handover engine enables the MN to perform inter-system handover to maintain the seamless connectivity, where connection to target network is made before breaking the current one.

Embodiments of the invention may be used in a mobile environment where a TCP window size is dynamically evaluated.

Embodiments of the invention may be used for example where the 2G/3G access is always available and the MN is using such a service and detects the imminent possibility of handover to wireless LAN network (WLAN) or the like.

In an alternative, a trigger is sent to the MN indicating that it is very likely to perform handover from GPRS to WLAN or vice versa. In embodiments of the invention, the trigger may provide at least one informative element such as QoS (quality of service) and/or bandwidth. That at least one informative element can be used in the determination of the window size parameter of the TCP. The trigger enable the algorithm for determining the window size and the MN can perform inter-system handover or intra-system handover in a relatively seamless manner as the TCP flow will adapt to new access characteristic (window size) smoothly. Thus embodiments of the invention may be used with network based or assisted handover solution or where the MN makes the handover decision.

An appropriately adapted computer program code product or products may be used for implementing the embodiments, when loaded on an appropriate processor, for example in a processor of the mobile communication device. The program code product for providing the operation may be stored on and provided by means of a carrier medium such as a carrier disc, card or tape. A possibility is to download the program code product to a mobile communication device via a data network. Implementation may be provided with appropriate software in a mobile communication device.

It is noted that whilst embodiments have been described in relation to mobile communication devices such as mobile terminals, embodiments of the present invention are applicable to any other suitable type of apparatus suitable for communication via a plurality of access nodes wherein a communication device can be handed over from a communication interface to another communication interface. The wireless interfaces may even be based on the same or different access technologies. A mobile communication device may be configured to enable use of different access technologies, for example, based on an appropriate multi-radio implementation.

It is also noted that although certain embodiments were described above by way of example with reference to the exemplifying architectures of certain cellular networks and a wireless local area network, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention as defined in the appended claims.

We claim:

1. An apparatus, comprising:
at least one processor; and at least one memory including computer program code,
wherein the at least one memory and the computer program code are configured to, with the at least one processor, cause the apparatus at least to
control a handover of the apparatus from a first access node to a second access node,
allocate information for a transmission control protocol window size to a transmission control protocol endpoint node, to which the apparatus is connected via a connection, before initiation of a registration of a new location address for said connection,
determine the information for the transmission control protocol window size based on at least one of application requirements, ongoing flow information, physical constraints of said apparatus, transmission control protocol parameters, transmission control protocol algorithms, and flow characteristics,
send a registration message to rendezvous server/home agent,
at least to have a delay δ between the allocating of said information for the transmission control protocol window size and the sending of the registration message, and
calculate said delay δ, wherein said delay δ comprises $$\delta \leq RTT_C - 0.5(RTT_A + RTT_B)$$

where $RTT_A$ is a round trip time from the apparatus to the rendezvous server/home agent via said second access node,
$RTT_B$ is a round trip time from the apparatus to the rendezvous server/home agent via a gateway node, and
$RTT_C$ is a round trip time from the apparatus to the first access node and the transmission control protocol endpoint node.

2. An apparatus as claimed in claim 1, wherein the at least one memory and the computer program code are further configured to, with the at least one processor, cause the apparatus at least to
establish said connection with said transmission control protocol endpoint node.

3. An apparatus as claimed in claim 1, wherein the at least one memory and the computer program code are further configured to, with the at least one processor, cause the apparatus at least to
establish said connection with one of a mobile node and a server, said one of said mobile node and said server comprising said transmission control protocol endpoint node.

4. An apparatus as claimed in claim 1, wherein the at least one memory and the computer program code are further configured to, with the at least one processor, cause the apparatus at least to provide a delay between allocating said information and registration of said new location address.

5. An apparatus as claimed in claim 1, wherein said first access node is associated with a first network comprising a first bandwidth and said second access node is associated with a second network comprising a second bandwidth, wherein said first bandwidth is greater than said second bandwidth, and wherein the at least one memory and the computer program code are further configured to, with the at least one processor, cause the apparatus at least to allocate said information for a reduced transmission control protocol window size for said connection.

6. An apparatus as claimed in claim 1, wherein the at least one memory and the computer program code are further configured to, with the at least one processor, cause the apparatus at least to control the handover of the apparatus from the first access node of one network to the second access node of a different network.

7. An apparatus as claimed in claim 6, wherein one of the networks is a wireless local area network and the other of the networks is a public land mobile network.

8. An apparatus as claimed in claim 1, wherein the at least one memory and the computer program code are further configured to, with the at least one processor, cause the apparatus at least to control the handover of the apparatus from the first access node of one network to the second access node of the same network.

9. An apparatus as claimed in claim 1, comprising a multi-radio.

10. An apparatus as claimed in claim 9, comprising a multi radio resource manager.

11. An apparatus as claimed in claim 10, wherein said multi radio resource manager is configured to provide flow characteristics for said apparatus.

12. An apparatus as claimed in claim 11, wherein said flow characteristics comprise at least one of bandwidth availability, round trip time, jitter, packet loss rate and bandwidth asymmetry.

13. An apparatus as claimed in claim 1, wherein said transmission control protocol window size has a minimum threshold.

14. An apparatus as claimed in claim 1, wherein the at least one memory and the computer program code are further configured to, with the at least one processor, cause the apparatus at least to allocate said information for the transmission control protocol window size with an acknowledgement message.

15. An apparatus as claimed in claim 1, wherein said transmission control protocol window size is changed by one or two segments when said apparatus is handed over from said first access node to said second access node.

16. A method, comprising:
allocating information for a transmission control protocol window size for a mobile node to a transmission control protocol endpoint node to which the mobile node is connected via a connection, when the mobile node is to be handed over from a first access node to a second access node;
initiating registration of a new location address for said connection after said information for the transmission control protocol window size has been allocated;
determining the information for the transmission control protocol window size based on at least one of application requirements, ongoing flow information, physical constraints of said mobile node, transmission control protocol parameters, transmission control protocol algorithms, and flow characteristics;
providing a delay δ between said sending said information for the transmission control protocol window size and initiating said registration of said new location address; and
calculating said delay δ , wherein said delay δ comprises $$\delta \leq RTT_C - 0.5(RTT_A + RTT_B)$$

where $RTT_A$ is a round trip time from the mobile node to a rendezvous server/home agent via said second access node,
$RTT_B$ is a round trip time from the mobile node to the rendezvous server/home agent via a gateway node, and RTT$_c$ is a round trip time from the mobile node to the first access node and the transmission control protocol endpoint node.

17. A method as claimed in claim 16, further comprising:
providing said information for the transmission control protocol window size with an acknowledgement message.

18. A method claimed in claim 16, further comprising:
changing said transmission control protocol window size by one or two segments when said mobile node is handed over from said first access node to said second access node.

19. An apparatus, comprising:
means for controlling a handover of a mobile node from a first access node to a second access node;
means for allocating information for a transmission control protocol window size to a transmission control protocol endpoint node, to which the mobile node is connected via a connection; and
means for initiating registration of a new location address for said connection, after providing said information for the transmission control protocol window size,
wherein the means for controlling determines the information for the transmission control protocol window size based on at least one of application requirements, ongoing flow information, physical constraints of said apparatus, transmission control protocol parameters, transmission control protocol algorithms, and flow characteristics, sends a registration message to rendezvous server/home agent, at least to have a delay between the allocating of said information for the transmission control protocol window size and the sending of the registration message, and calculates a delay $\delta$, wherein said delay $\delta$ comprises $$\delta \leq RTT_C - 0.5(RTT_A + RTT_B)$$

where RTT$_A$ is a round trip time from the apparatus to the rendezvous server/home agent via said second access node,
RTT$_B$ is a round trip time from the apparatus to the rendezvous server/home agent via a gateway node, and
RTT$_c$ is a round trip time from the apparatus to the first access node and the transmission control protocol endpoint node.

20. An integrated circuit for a mobile node, said integrated circuit comprising:
a handover engine configured to
control a handover of the mobile node from a first access node to a second access node,
allocate information for a transmission control protocol window size to a transmission control protocol endpoint node, to which the mobile node is connected via a connection, before said handover engine is configured to initiate registration of a new location address for said connection,
determine the information for the transmission control protocol window size based on at least one of application requirements, ongoing flow information, physical constraints of said mobile node, transmission control protocol parameters, transmission control protocol algorithms, and flow characteristics,
send a registration message to rendezvous server/home agent,
at least to have a delay $\delta$ between the allocating of said information for the transmission control protocol window size and the sending of the registration message, and
calculate said delay $\delta$, wherein said delay $\delta$ comprises $$\delta \leq RTT_C - 0.5(RTT_A + RTT_B)$$

where RTT$_A$ is a round trip time from the mobile node to the rendezvous server/home agent via said second access node,
RTT$_B$ is a round trip time from the mobile node to the rendezvous server/home agent via a gateway node, and
RTT$_c$ is a round trip time from the mobile node to the first access node and the transmission control protocol endpoint node.

21. A computer program product embodied on a non-transitory computer readable storage medium, the computer program product being encoded with instructions to control a processor to perform a process, the process comprising:
allocating information for a transmission control protocol window size for a mobile node to a transmission control protocol endpoint node to which the mobile node is connected via a connection, when the mobile node is to be handed over from a first access node to a second access node;
initiating registration of a new location address for said connection after said information for the transmission control protocol window size has been allocated; and
determining the information for the transmission control protocol window size based on at least one of application requirements, ongoing flow information, physical constraints of said mobile node, transmission control protocol parameters, transmission control protocol algorithms, and flow characteristics;
providing a delay $\delta$ between said allocating said information for the transmission control protocol window size and initiating said registration of said new location address; and
calculating said delay $\delta$, wherein said delay $\delta$ comprises $$\delta \leq RTT_C - 0.5(RTT_A + RTT_B)$$

where RTT$_A$ is a round trip time from the mobile node to a rendezvous server/home agent via said second access node
RTT$_B$ is a round trip time from the mobile node to the rendezvous server/home agent via a gateway node, and
RTT$_c$ is a round trip time from the mobile node to the first access node and the transmission control protocol endpoint node.

* * * * *